(12) United States Patent
Go et al.

(10) Patent No.: US 6,466,706 B1
(45) Date of Patent: Oct. 15, 2002

(54) PULSED SYSTEM AND METHOD FOR FIBER OPTIC SENSOR

(75) Inventors: Vinson L. Go, Raleigh, NC (US); Daniel L. Baker, Voluntown, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 71 days.

(21) Appl. No.: 09/685,150

(22) Filed: Oct. 11, 2000

(51) Int. Cl.[7] .................................................. G02B 6/28
(52) U.S. Cl. ........................................... 385/12; 385/13
(58) Field of Search ..................................... 385/12, 13

(56) References Cited

U.S. PATENT DOCUMENTS

| | | | | |
|---|---|---|---|---|
| 4,818,064 A | * | 4/1989 | Youngquist et al. | 350/96.15 |
| 4,995,697 A | * | 2/1991 | Adamovsky | 350/96.29 |
| 5,051,965 A | * | 9/1991 | Poorman | 385/42 |
| 5,917,597 A | * | 6/1999 | Hall et al. | 385/12 |
| 6,097,486 A | * | 8/2000 | Vakoc et al. | 385/12 |

* cited by examiner

Primary Examiner—Georgia Epps
Assistant Examiner—Richard Hanig
(74) Attorney, Agent, or Firm—Michael J. McGowan; Michael F. Oglo; James M. Kasischke

(57) ABSTRACT

A system and method is disclosed for generating, propagating, and detecting light pulses for use with a fiber optic transducer array. The system preferably uses two pulses to provide fixed and relatively short interferometer path differences to thereby reduce coherent light noise. The system preferably uses a surface acoustic wave device for chirping the light pulses to thereby spread noise over a wider bandwidth so as to suppress noise. A coherent light source is preferably amplitude modulated to produce an initial pulse. In one embodiment, that initial pulse is chirped and split into two pulses. One of the two pulses is delayed while the other is frequency shifted. The two pulses are combined onto a single fiber optic path and applied to the fiber optic transducer array. After being acted on by the fiber optic transducer array, the two pulses are photodetected and processed to obtain the information about the physical phenomena to be detected.

15 Claims, 2 Drawing Sheets

PULSED SYSTEM AND METHOD FOR FIBER OPTIC SENSOR

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION

(1) Field of the Invention

The present invention relates generally to fiber optic sensor systems and, more specifically, to apparatus and method for fiber optic sensing including generating, propagating, and detecting highly repeatable pulses through a fiber optic sensor system.

(2) Description of the Prior Art

Prior art fiber optic sensor systems, such as fiber optic acoustic sensor systems, typically incorporate either Michelson or Mach-Zehnder type interferometers. These interferometers have high sensitivity and high dynamic range. In using these interferometers, a continuous light wave is split into two paths. The first path is used as a reference giving rise to a reference beam, while the second path is used as the sensor path which provides the signal beam. The acoustic field modulates the lightwave in the second path, usually by means of a fiber optic transducer. The two beams (reference beam and the signal beam) are recombined and the resulting interference is detected at a photoreceiver. Noise from extraneous acoustic fields or vibration may be picked up by the reference beam or by the lead cable of the fiber optic sensors. Phase noise of a coherent light source, as detected by the photoreceiver, increases with increased interferometer path differences. The response of a Mach-Zehnder interferometer may be limited by phase noise if the path differences for the reference and the signal beams are large. As well, large phase drifts may be produced in such systems due to temperature effects on the interferometer. For a homodyne system, a phase tracking scheme is needed to compensate for the large phase drifts that result from temperature effects on the interferometer. Amplitude noise may also be produced by self-interference of the lightwave due to scattering or reflecting within the fiber optic paths.

Previous methods for generating light pulses for general usage are not always suitable for fiber optic sensor systems. For instance, a previous pulse generating method as discussed in more detail in the references listed below, chirps the light source itself. For purposes of fiber optic sensor system, this method is considered to be difficult to control and produces noisy signals that are not highly repeatable. Another previous method, as also discussed below, uses the non-linear properties of optical fiber to chirp a pulse but requires high light power to generate these signals.

U.S. Pat. No. 4,486,657, issued Dec. 4, 1984, to I. J. Bush, discloses a fiber optic acoustic sensing system for tracking a phase shift linearly over a wide range. Light from a laser is split and coupled into both legs of a fiber interferometer. One leg is phase modulated by the acoustic signal while the other leg is phase modulated by first and second piezoelectric cylinder modulators. The light signals in the two legs are combined to produce an error signal. The error signal is fed back to control the first modulator.

U.S. Pat. No. 4,588,957, issued May 13, 1986, to Balant et al., discloses a system wherein an optical pulse is passed through a nonlinear dispersive delay line, which chirps the pulse by the nonlinear process of self-phase modulation and simultaneously and interactively broadens the pulse by the process of group velocity dispersion. By making the optical pulse suitably intense, a single mode optical fiber may act as the nonlinear dispersive delay line.

U.S. Pat. No. 5,430,569, issued Jul. 4, 1995, to Blauvelt et al., discloses a chirp signal generator coupled to the signal path of an RF input signal that carries information to modulate the laser optical output. In some cases, the frequency of the chirp generating signal may result in second order intermodulation products falling within the information band. In such cases, the RF input signal is predistorted to offset the expected distortion products.

U.S. Pat. No. 5,453,868, issued Sep. 26, 1995, to Blauvelt et al. is a continuation of the above patent, i.e., U.S. Pat. No. 5,430,569, to the same inventors.

U.S. Pat. No. 4,313,185, issued Jan. 26, 1982, to J. L. Chovan, discloses an acoustic vibration sensing system having principal application to hydrophones and operating under the optical heterodyning principle. The sensor employs a pair of single mode fibers, optically coupled by a path whose length is varied by the acoustic vibrations. The path includes a partially reflecting discontinuity at the sensitive end of each fiber. Optical signals of one frequency are supplied to one fiber, and of another frequency to the other fiber. Optical signals of the same difference frequency emerge from the "dry end" of each fiber. When these two emergent signals are photodetected and the phase or frequency difference is obtained, the acoustic vibration is sensed.

U.S. Pat. No. 4,363,114, issued Dec. 7, 1982, to Bucaro et al., discloses an optical system for frequency modulation heterodyne detection of an acoustic pressure wave signal. An optical beam is directed into a Bragg cell outside of the fluid medium in which acoustic signals are to be detected. The Bragg cell modulates the incident beam such that two beams of different frequency exit the cell. The two beams are combined and transmitted to a fiber optic transducer disposed in the medium. The transducer includes two coiled optical fibers, a reference fiber and a signal fiber, each of which has a different sensitivity to incident acoustic pressure wave signals. A filter in the signal fiber transmits on a fraction of the light. The two parts of the split beam exiting the coiled optical fibers are coupled into another optical fiber and transmitted to a photodetector from which the output signal is processed to indicate the detection of an acoustic pressure wave signal.

In summary, while the prior art shows various specific fiber optic acoustic systems and means for generally producing optical pulses, the above disclosed prior art does not show an acoustic sensor system using a pulsed system for fiber optic acoustic signal detection. The prior art does not disclose a pulsed fiber optic sensor system wherein pulses may pass through several fiber optic sensor arrays. Consequently, there remains a need for a system that uses optical pulses in an optical sensor system to reduce coherent light phase noise, that provides improved optical pulses suitable for low noise optical sensors, and that eliminates the need for a phase tracker circuit. Those skilled in the art will appreciate the present invention that addresses the above and other problems.

SUMMARY OF THE INVENTION

Accordingly, it is an object of the present invention to provide an improved fiber optic sensor system.

It is yet another object of the present invention to use heterodyne dual light pulses to interrogate the fiber optic transducers.

It is another object of the present invention to reduce the noise associated with the pulses by chirping the dual pulses.

These and other objects, features, and advantages of the present invention will become apparent from the drawings, the descriptions given herein, and the appended claims.

In accordance with the present invention, a method for a fiber optic sensor system for sensing a physical phenomena is disclosed. The method includes steps such as generating first and second light pulses from a coherent light source such that the second light pulse is time delayed with respect to the first light pulse. The first and second light pulses are directed into a lead fiber optic cable connected to one or more fiber optic transducers. The first and second light pulses are then directed from the one or more fiber optic transducers for photo detection to produce an electrical signal containing information related to the physical phenomena.

In one embodiment, a single light pulse is initially produced from the coherent light source, such as by gating an optical amplitude modulator as discussed below, although the optical amplitude modulator could be used to produce both pulses. That pulse travels on a fiber optic path into a splitter to form a first fiber optic light path and a second fiber optic light path. The first light pulse is produced on the first fiber optic path and the second light pulse is produced on the second fiber optic path. The second light pulse is delayed with respect to the first light pulse. The first pulse is preferably frequency shifted or frequency modulated. The first and second light pulses are then recombined in a single optical path.

In one preferred embodiment, the single light pulse from the coherent light source is chirped by some means such as with a surface acoustic wave device. A unique method for chirping an optical pulse is provided that includes steps such as producing an electrical pulse signal and applying the electrical pulse signal to a surface acoustic wave device to produce a chirp signal. The chirp signal is applied to an optical frequency modulator to chirp the optical pulse to produce a chirped optical pulse. The optical fiber on which the chirped optical pulse travels is split to produce first and second chirped optical pulses.

After being propagated through the optic fiber sensor system, the first and second light pulses are reflected from the fiber optic transducers through a lead fiber optic cable, as discussed below. A circulator is preferably used both for directing the first and second light pulses into the lead fiber optic cable and for directing the first and second light pulses from the lead fiber optic cable for photo detection.

The pulsed system for use with the fiber optic sensor array includes elements such as a coherent light source and means for producing the first and second light pulses from the coherent light source such that the second light pulse is delayed with respect to the first light pulse. A photodetector receives the first and second light pulses after propagation through the one or more fiber optic transducers to produce an electrical signal containing information related to at least one physical phenomena. A delay line may be used in series with the second fiber optic path to delay the second pulse. A frequency shifter in series with the first fiber optic path is used to shift the frequency of the first pulse to a carrier frequency. A circulator may be used for directing the first and second light pulses between the means for producing the first and second light pulses, the one or more fiber optic transducers, and the detector.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

BRIEF DESCRIPTION OF THE PREFERRED EMBODIMENTS

Figure 1:
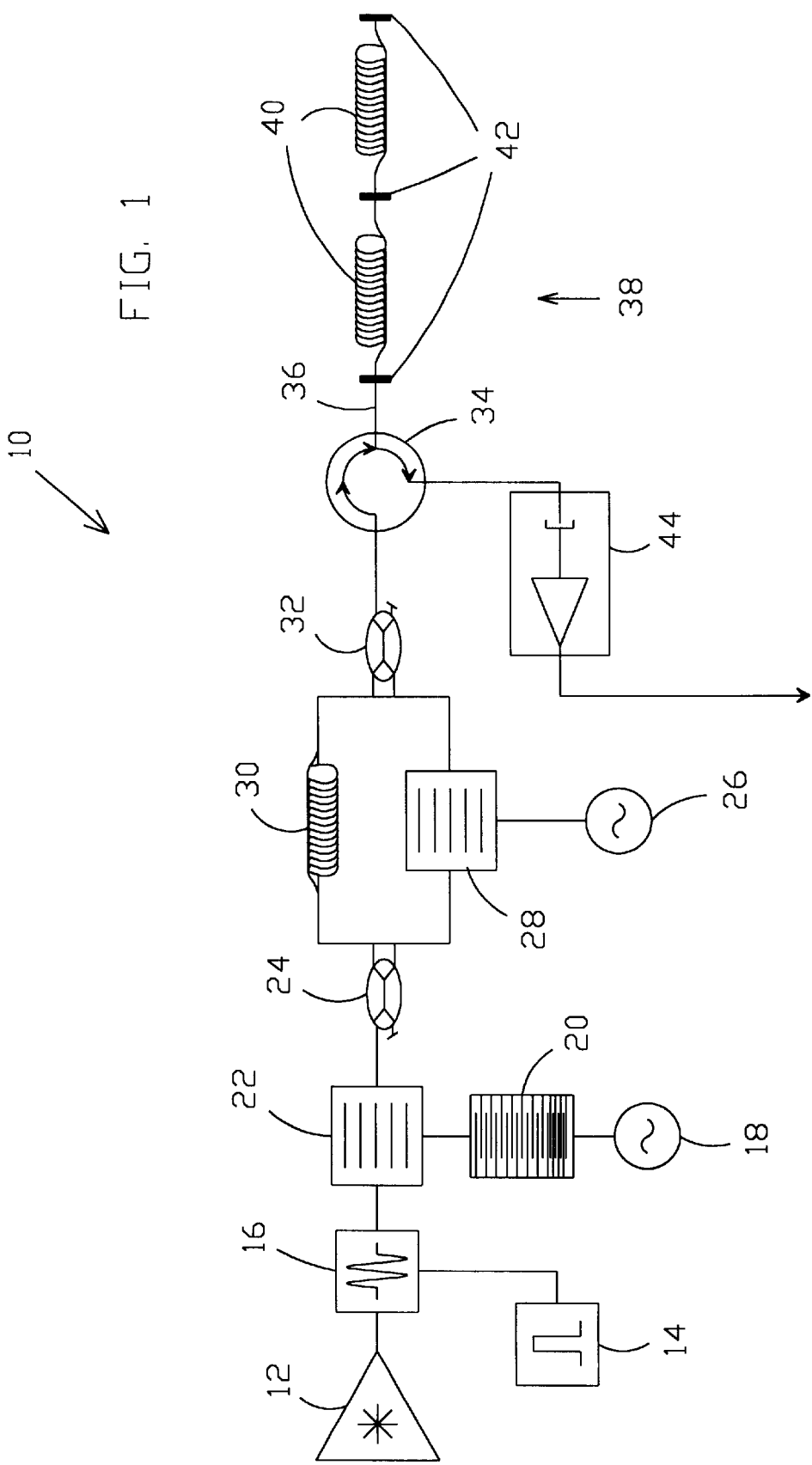
FIG. 1 is a circuit diagram of a fiber optic sensor system in accord with the present invention.

Referring now to the drawings and, more particularly, to FIG. 1 there is shown a fiber optic sensor system 10 in accord with the present invention. While the present invention is especially useful with one or more arrays of fiber optic acoustic sensors, it could also be used with or in combination with other types of fiber optic sensors.

In one presently preferred embodiment of the present invention, a single light pulse is initially created utilizing light from coherent light source 12. For this purpose, a gate signal is produced by gating circuit 14 and applied to amplitude modulator 16 to switch light on and then off to produce the single light pulse. A pulsed frequency signal or impulse is produced by pulsed frequency signal generator or impulse generator 18 for application into a surface acoustic wave (SAW) device 20 to create a chirp signal in accord with the present invention that provides a novel approach for generating a chirp signal. As discussed herein, a pulse is of a short duration and may include several cycles or only one-half a cycle and therefore would include impulses and pulsed frequency signals. SAW devices are typically formed using a piezoelectric substrate, such as crystalline quartz, onto which interdigital electrodes are bonded in a pattern as suggested by the pattern shown in the schematic of FIG. 1 for SAW device 20. The chirp signal is fed into optical frequency modulator 22, and in this way a chirp modulation is imposed on the light pulse in a unique manner. This method of generating chirped light pulses produces very stable, clean, and repeatable signals, using only a few discrete optical components. An advantage of chirping the light pulses is noise suppression by spreading noise over a wider bandwidth.

In one presently preferred embodiment of the invention, the light pulse is split into two equal pulses by fiber optic splitter 24. Heterodyne frequency generator 26 produces a heterodyne frequency signal that is fed into fixed frequency shifter 28 to thereby frequency shift one of the light pulses. The other light pulse is preferably time-delayed by delay line 30. The two pulses so generated are now separated in time and distance determined by delay line 30. The two pulses are then recombined into a single optic path by fiber optic combiner 32. An advantage of using a dual pulse system as compared to a continuous signal system is the fixed and relatively short interferometer path differences that reduce coherent light phase noise.

Fiber optic circulator 34 directs forward and returning light pulses to prevent light from traveling back toward the optical pulse generating components. The forward propagating light pulses from the optical pulse generating components travel down lead optical fiber cable 36 and into fiber optic sensor array 38 that, in the presently preferred embodiment, comprises a fiber optic acoustic transducer array. Fiber optic sensor array 38 is comprised of one or more fiber optic transducers 40 that produce a phase modulation on the light pulses in response to an acoustic field. The pulses are reflected back up lead optical fiber cable 36 by reflectors 42 in the fiber optic sensor path. The two pulses overlap each other at a point where the reflected lag pulse coincides with the reflected lead pulse, causing an interference of the two light pulses. Examples of suitable reflectors 42 include but are not limited to Bragg gratings, metal film and dielectric film.

All light signals travel back up lead optical fiber cable 36 and through circulator 34. Circulator 34 directs pulses returning from fiber optic sensor array 38 to photodetector 44. Photodetector 44 converts the interfered light pulses into electrical signals that represent the acoustic phase modulation on the frequency carrier signal. After appropriate frequency band shifting, the signal is time sampled and processed to preferably locate particular fiber optic transducers 40 along fiber optic transducer array 38 and to extract the acoustic signals related to any particular sensor of interest. Once the two pulses clear the entire array, another set of dual pulses are generated.

Figure 2:
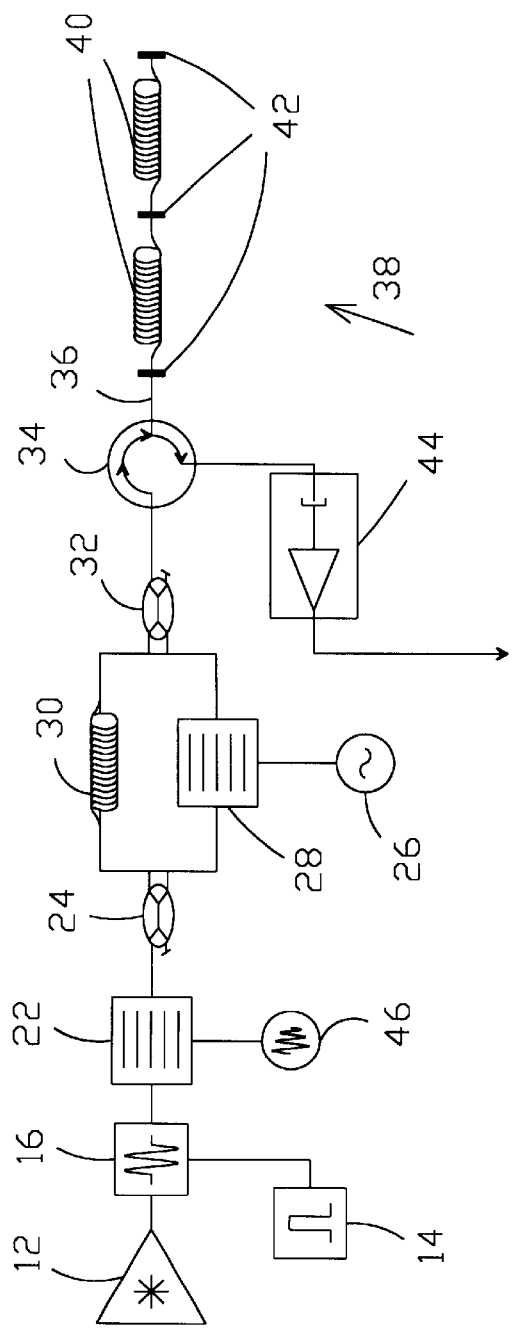
FIG. 2 is an alternative embodiment of the present invention having a sweep frequency generator instead of a surface acoustic wave device for creating a chirp signal.

In another embodiment of the invention as shown in FIG. 2, a swept frequency generator 46 is used in place of the SAW device (shown as item 20 in FIG. 1). The invention may use either linear or non-linear chirp modulation.

Figure 3:
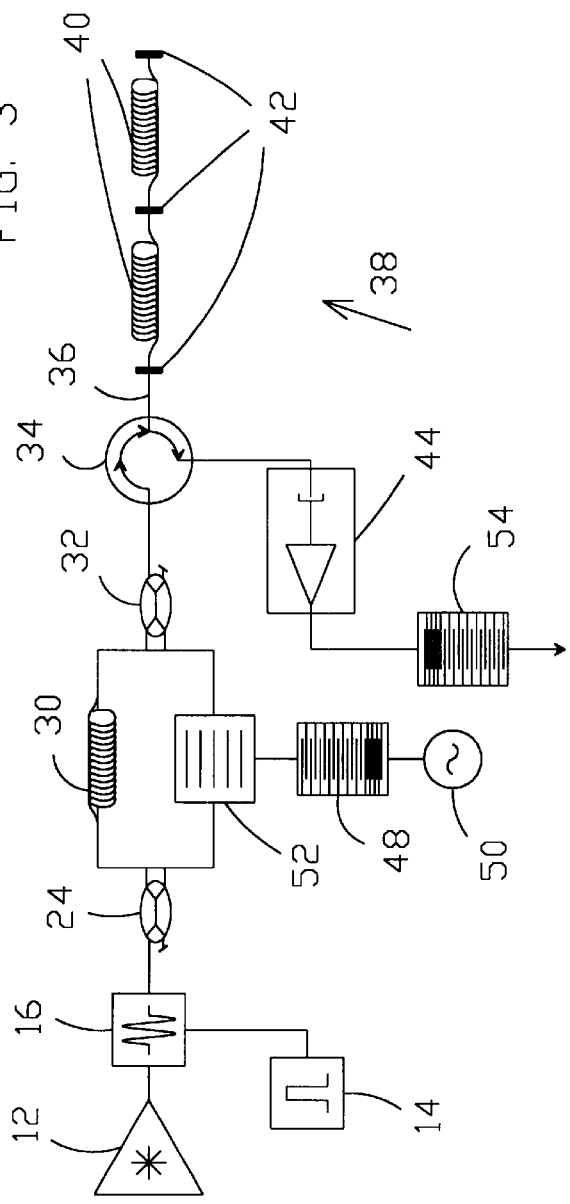
FIG. 3 is another alternative embodiment of the invention wherein a chirp signal is applied at the carrier frequency.

In yet another embodiment of the invention as shown in FIG. 3, SAW device 48, pulsed frequency or impulse generator 50, and optical frequency modulator 52 replace the fixed frequency shifter (shown as item 26 in FIG. 1 and FIG. 2) to provide a chirp signal at the carrier frequency if the appropriate center frequency is chosen. Otherwise, the fixed frequency generator could be used in combination with the SAW device, pulsed frequency shifter, and optical frequency modulator. If desired, another type of chirp frequency generator could be used in place of the SAW device. More than one optical frequency modulators 52 could be used if necessary. In the embodiment of FIG. 3, an inverse chirp function is produced using inversely oriented SAW device 54 to compress the received signal back to a heterodyne.

Numerous variations of the above discussed circuitry may be used to effect the basic principles of operation discussed for use of two light pulses to interrogate a fiber optic sensor array with two pulses. For instance, it might be desirable to include optical components to improve operation such as optical isolators, fiber optic amplifiers, fiber optic bandpass filters, polarization controllers, and fiber optic reflectors. Examples of fiber optic reflectors include but are not limited to Bragg gratings, metal film, and dielectric film. In the pulse generation stage, the two pulses could be generated using amplitude modulator 16 as controlled by gate signal generator 14 instead of using fixed delay line 30. Pulse shaping may be performed by amplitude modulator 16 to reduce time sidelobes in the light signal. It would also be possible to use an optical frequency modulator fed by a SAW device or chirp frequency generator such as in the pulse path after item 28 in FIG. 1. An optical frequency modulator could be placed in series with the delay line if a fixed frequency shifter is used. Other spread spectrum techniques may also be used instead of the chirping. Some examples are frequency hopping and pseudo-random encoding of the light frequency or phase. The same method of optical modulation and demodulation is applied to the spread spectrum techniques as in the chirp pulse methods.

In summary, the present invention is operable for producing two stable pulses that have a fixed and relatively short path length therebetween to reduce coherent light phase noise as they propagate through the fiber optic sensor system. Preferably the two pulses are chirped using a highly stable means to suppress noise by spreading the noise over a wider bandwidth. Another advantage of chirping is the reduction of self-interference from extraneous reflections in the sensor path. One of the generated pulses is frequency shifted to a carrier frequency as compared to the delayed pulse. The two pulses generated by one of the several means discussed above are combined and applied to the fiber optic sensor system and reflected back out to where the pulses are detected by a photodetector. The two pulses overlap each other to a certain extent to cause an interference that may be converted by the photodetector into electrical signals that represent the acoustic phase modulation on the frequency carrier. After appropriate band shifting with respect to the carrier frequency, the signal is time sampled and processed to locate particular sensors along the fiber optic array and to extract the information, such as acoustic signals.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A pulsed method for a fiber optic sensor system for sensing a physical phenomena, comprising the steps of:

generating first and second light pulses from a coherent light source such that said second light pulse is time delayed with respect to said first light pulse;

directing said first and second light pulses to one or more fiber optic transducers for detecting said physical phenomena;

applying said electrical signals from said photo detection to a surface acoustic wave device; and directing said first and second light pulses from said one or more fiber optic transducers for photo detection to produce an electrical signal containing information related to said physical phenomena.

2. The method of claim 1 further comprising:

initially producing a single light pulse from said coherent light source;

splitting a fiber optic path for said single light pulse into a first fiber optic light path and a second fiber optic light path to produce said first light pulse on said first fiber optic path and said second light pulse on said second fiber optic path;

delaying said second light pulse with respect to said first light pulse along said second fiber optic path; and recombining said first and second light pulses into a single optical path.

3. The method of claim 1 further comprising:

initially producing a single light pulse from said coherent light source; and chirping said single light pulse with a surface acoustic wave device.

4. The method of claim 1 further comprising activating an amplitude modulator to initially produce a single light pulse from said coherent light source.

5. The method of claim 1 further comprising modulating light from said coherent light source to produce said first and second light pulses.

6. The method of claim 1 further comprising frequency modulating said first pulse with a signal from a surface acoustic device and thus frequency shifting of said first pulse.

7. The method of claim 1 further comprising reflecting said first and second light pulses from said fiber optic transducers through a lead fiber optic cable and using a circulator for both directing said first and second light pulses and second light pulses from said lead fiber optic cable for said photo detection.

8. A method for chirping an optical pulse, comprising:

producing an electrical pulse signal;

applying said electrical pulse signal to a surface acoustic wave device to produce a chirp signal;

applying said chirp signal to an optical frequency modulator to chirp said optical pulse to produce a chirped optical pulse;

splitting an optical fiber into a first optical fiber and second optical fiber through which said chirped optical pulse travels to produce first and second chirped optical pulses;

frequency shifting of said first chirped pulse to produce a frequency shifted optical pulse;

delaying said second chirped optical pulse to produce a delayed optical pulse;

joining said first and second fibers to thereby combine said frequency shifted optical pulse and said delay optical pulse onto a single optical fiber;

directing said frequency shifted optical pulse and said delayed optical pulse into one or more fiber optic transducers to produce fiber optic transducer modified first and second pulses; and directing said fiber optic transducer modified first and second pulses to a photoreceiver.

9. A pulsed fiber optic sensor system, comprising:

a coherent light source;

a fiber optic splitter for splitting an optical path of said initial pulse to produce said first and second light pulses on respective first and second fiber optic paths;

a delay member in series with said second fiber optic path;

a fiber optic combiner for combining said first and second fiber optic paths so that said first and second light pulses are on a single fiber optic path;

one or more fiber optic transducers responsive to at least one physical phenomena for receiving said first and second light pulses from said single fiber optic path; and a detector for receiving said first and second light pulses after said one or more fiber optic transducers to produce an electrical signal containing information related to said at least one physical phenomena.

10. The system of claim 9 further comprising chirping means for chirping said first and second light pulses.

11. The system of claim 10 wherein said chirping means comprises a surface acoustic wave device.

12. The system of claim 10 further comprising spread spectrum means for acting on said first and second light pulses.

13. The system of claim 9 further comprising an optical amplitude modulator for producing an initial pulse.

14. The system of claim 9 further comprising a frequency shifter in series with said first fiber optic path.

15. The system of claim 9 further comprising a circulator for directing said first and second light pulses between said means for producing, said one or more fiber optic transducers, and said detector.

* * * * *